(12) United States Patent
Garner et al.

(10) Patent No.: US 7,144,448 B2
(45) Date of Patent: *Dec. 5, 2006

(54) AUTOSELECTIVE REGENERATING PARTICULATE FILTER

(75) Inventors: Colin P. Garner, Loughborough (GB); John E. Harry, Oakham (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/701,542

(22) Filed: Nov. 5, 2003

(65) Prior Publication Data

US 2004/0088955 A1  May 13, 2004

Related U.S. Application Data

(63) Continuation of application No. 10/031,214, filed as application No. PCT/GB00/02451 on Jun. 26, 2000, now Pat. No. 6,660,068.

(30) Foreign Application Priority Data

Jul. 12, 1999  (GB) .................................. 9916254.7

(51) Int. Cl.
*F01N 3/00* (2006.01)
*B01D 41/04* (2006.01)

(52) U.S. Cl. ........................... 95/278; 55/282.3; 55/523

(58) Field of Classification Search .................. 95/278, 95/283; 55/282.2, 282.3, 428.1, 523
See application file for complete search history.

(56) References Cited

U.S. PATENT DOCUMENTS

| | | | |
|---|---|---|---|
| 3,979,193 A | 9/1976 | Sikich | |
| 4,376,637 A | 3/1983 | Yang | |
| 4,505,107 A | 3/1985 | Yamaguchi et al. | |
| 4,535,589 A | 8/1985 | Yoshida et al. | |
| 4,631,452 A | 12/1986 | Harry | |
| 4,866,728 A | 9/1989 | Evans et al. | |
| 4,897,096 A | 1/1990 | Pischinger et al. | |
| 4,954,263 A * | 9/1990 | Woodhouse | 210/695 |
| 4,979,364 A * | 12/1990 | Fleck | 60/274 |
| 5,044,157 A * | 9/1991 | Henkel | 60/274 |
| 5,259,190 A * | 11/1993 | Bagley et al. | 60/300 |
| 5,440,876 A * | 8/1995 | Bayliss et al. | 60/274 |
| 5,746,051 A | 5/1998 | Kieser et al. | |
| 5,750,026 A * | 5/1998 | Gadkaree et al. | 210/502.1 |
| 6,245,126 B1 | 6/2001 | Feldman et al. | |

(Continued)

FOREIGN PATENT DOCUMENTS

DE  37 05 979  9/1988

(Continued)

OTHER PUBLICATIONS

"Self-Cleaning Electrostatic Muffler for Diesel Vehicles," Society of Automative Engineers, Inc., A. Colletta, G. Costa, M. Pinti, Oct. 1995.

(Continued)

*Primary Examiner*—Frank M. Lawrence
(74) *Attorney, Agent, or Firm*—John J. Cheek

(57) ABSTRACT

An apparatus for removing particulates from a gas stream is described comprising a filter through which gas may be caused to flow, at least one first electrode for producing an atmospheric glow discharge located near to but spaced apart from the filter, and at least one second counter electrode, the electrodes being connected to an AC voltage supply generating an AC voltage in a frequency within the range of 1 kHz to 200 kHz. A method of removal of particulates from a gas stream comprising causing the gas to flow through such an apparatus is also described.

35 Claims, 12 Drawing Sheets

U.S. PATENT DOCUMENTS

| | | | |
|---|---|---|---|
| 6,660,068 B1 * | 12/2003 | Garner et al. | 95/283 |
| 2001/0043890 A1 | 11/2001 | Son | |

FOREIGN PATENT DOCUMENTS

| | | | |
|---|---|---|---|
| DE | 37 23 154 | | 1/1989 |
| DE | 38 29 048 | | 3/1990 |
| DE | 42 30 630 | | 3/1994 |
| DE | 42 30 631 | | 3/1994 |
| DE | 196 10 137 | | 9/1997 |
| EP | 0 504 422 | | 9/1992 |
| GB | 2 145 589 A | | 3/1985 |
| GB | 2 145 591 A | | 3/1985 |
| GB | 2 228 072 | | 8/1990 |
| GB | 2 274 412 | | 7/1994 |
| JP | 2-75314 | | 3/1990 |
| JP | 6-146852 | | 5/1994 |
| JP | 06-146852 A | * | 5/1994 |
| WO | WO 93/08382 | | 4/1993 |
| WO | WO 94/07008 | * | 3/1994 |
| WO | WO 97/02140 | | 1/1997 |
| WO | WO 97/02909 | | 1/1997 |
| WO | WO 97/07008 | | 2/1997 |
| WO | WO 97/30274 | * | 8/1997 |
| WO | WO 97/39822 | | 10/1997 |
| WO | WO 97/40265 | | 10/1997 |
| WO | WO 01/04467 | | 1/2001 |
| WO | WO 01/92694 | | 12/2001 |

OTHER PUBLICATIONS

Electrochemical Diesel Particulate Filter, Society of Automotive Engineers, Inc., J. Dinesen, S.S. Nissen, H. Christensen, 1998.

* cited by examiner

AUTOSELECTIVE REGENERATING PARTICULATE FILTER

CROSS-REFERENCE TO RELATED APPLICATIONS

This is a continuation of application Ser. No. 10/031,214, filed Jan. 11, 2002 now U.S. Pat. No. 6,660,068, which was the national stage of International Application No. PCT/GB00/02451, filed on Jun. 26, 2000, which claims priority to British Application No. 9916254.7, filed on Jul. 12, 1999.

TECHNICAL FIELD

The present invention relates to an improved apparatus and method for removing particulates from gas streams, the apparatus being autoselectively regenerating (self-cleaning) in use.

BACKGROUND

Internal combustion engines and static hydrocarbon burning equipment tend to emit, via their exhaust systems, carbonaceous particles commonly referred to as particulates. Whilst unrelenting efforts are being expended towards reducing particulate emissions at source, particulate filters (traps) in the exhaust systems of such equipment are becoming essential to meet increasingly strict environmental legislation and public expectations.

Particulate filters which may be regenerated are known. In some cases these require regular removal from the equipment to which they are fitted followed by burning (oxidation) of the trapped particulates and refitment to the equipment. Particulate filters may be regenerated in this way by removal at the end of a working day, heating to a high temperature overnight to burn the collected particulates and refitting in the morning.

The removal, cleaning and refitting process has the disadvantage that the equipment is taken out of service for several hours, labor is required to remove, clean and refit the filter and the filter is generally subjected to a set cleaning process irrespective of the level of particulate build-up within it. Further, as the filter builds up its particulate content in use, resistance to exhaust gas flow is increased and thus an oversized filter may be required.

Taking mobile on-highway and off-highway vehicles out of service to regenerate the filter is particularly undesirable, and regeneration in situ offers clear advantages.

A conventional option is to provide two parallel filters, each one of which is alternately by-passed for regeneration in situ. However, there is a significant size and cost penalty with this system, the size of a particulate filter being typically the same as the swept volume of an associated naturally-aspirated engine and up to three times the swept volume of an associated turbocharged engine.

It is clearly desirable for regeneration to occur during use. However, for rapid oxidation of trapped particulate there must be sufficient free oxygen available, preferably included within the exhaust stream at its source. The free oxygen within the exhaust stream from a diesel engine ranges from 3% to 20%. In addition, unless pre-treated by, for example, catalyst or fuel additive means, the particulate must be at a temperature of at least 550° C. for rapid oxidation to take place. However, this level of exhaust gas temperature occurs only for the upper part of an engine load-speed map, therefore extra energy must be put into the exhaust gas stream, the filter or the trapped particulate itself for it to be raised above 550° C. for all engine operating conditions.

A conventional form of regenerating particulate filter incorporates a fuel burner system. This relies upon large amounts of heat being introduced into the exhaust system by fuelling, thus low particulate loadings can be oxidized. However, there is an unreliability concern with fuel burner systems associated with the required burner, ignition means, air pumps and isolation valves and the cost of such systems is relatively high. Further, most conventional systems require a method of measuring the amount of trapped particulate before regeneration commences, this being difficult and usually too inaccurate for optimum reliability of operation. Also, such a system will inherently have a detrimental effect on fuel consumption.

Other systems have been suggested which rely upon a control of the engine throttling. In essence, such systems have a throttle arrangement that is used intermittently to cause the engine to run richer at certain times to promote higher exhaust temperatures. Such systems have proven to be noisy in practice and also to have an adverse effect on both vehicle driveability and fuel economy.

Systems which use electrical resistance heaters to impart the extra energy have been proposed. However conventional electrical resistance heaters are likely to require significant energy input which can place an unacceptably high load on the engine's battery/alternator system.

There have been suggestions that the use of microwave energy to impart the extra energy required might overcome some of these difficulties. However, such systems may have safety implications, and are not necessarily cheap.

Furthermore, reliability problems may arise with many conventional regenerating particulate filter systems as a result of their reliance on the exothermic nature of the oxidation to sustain the regeneration reaction. This leads to a basic requirement to have an optimum amount of trapped particulate in the filter to promote efficient oxidation. If there is too much particulate, then the heat released during oxidation may cause melting of the filter element or monolith leading to an almost total loss of filtration. If there is too little trapped particulate, there may be insufficient chemical energy to maintain oxidation and the process may die out leaving an unregenerated filter. Fuel burner systems depend less on the chemical energy in the particulate to sustain oxidation, but more on putting large amounts of heat energy into the exhaust stream. However, although this allows potentially lower particulate loadings to be oxidized, the unreliability of the fuel burner systems associated with the burner, ignition means, air pumps and isolation valves has already been outlined.

A known apparatus directed to avoid this operates by introducing fuel additives in controlled doses to reduce the temperature required to burn off particulates in conjunction with engine control strategies such as pilot injection via a common rail injection system to elevate the exhaust temperature, plus oxidation and reduced-temperature catalysts and a sensor for detecting when regeneration is needed. This system thus relies on an amalgamation of potentially complex and expensive equipment.

It will be seen from the above commentary that it is desirable for a particulate filter to be self-regenerating in use, under any load, in order to maintain filtering and gas-flow efficiencies above a certain level whilst keeping filter sizing to a minimum. It is also desirable that the filter is self-controlled to regenerate only when a predetermined level of particulates is present and to do so without requiring any external sensing means. It is further desirable that the regeneration process is economic in the use of any externally supplied energy or material, that the construction of the filter is also economic, and that the system is effective irrespective of types and compositions of fuel and engine operating conditions.

WO 94/07008 discloses an apparatus and a method said to provide a self-controlled, self-regenerating, particulate filter apparatus in which electrical spark and/or short time duration ("preferably between 0.001 sec and 0.1 sec") arc discharges oxidize and burn trapped particulates. It is asserted within '07008 that the electrical discharges will occur only when carbon has accumulated to a sufficient thickness and homogeneity to become electrically conducting, which leads to a spark and/or arc discharge between the conducting layer and the electrodes when a certain limiting layer is reached.

In order to function, the apparatus would require at least a heavily loaded filter and it would not be expected to work at all at low loadings. Further, the preferred frequency of 50 Hz is within the human aural range and in a range which is not easily muffled, therefore audible noise emissions may result.

WO 94/07008 also recites that it is particularly suitable to divide the gas stream into two different streams, with a different filter being installed in each, and that it is particularly advantageous to provide the addition of air and/or oxygen to the gas stream during regeneration. It is clear that each of these operations will incur the need for additional apparatus which will add to the cost and size of the overall system.

WO 94/07008 describes simple filter tube or plate arrangements rather than conventional particulate filter monoliths. These simple arrangements present only a limited filter surface area for given size and, would need to be impracticably large in order to present a filtering surface of sufficient area to avoid unacceptable back-pressure. In contrast, a conventional particulate filter monolith may typically comprise a cylinder of 250 mm length and 150 mm diameter enclosing 2800 longitudinal cells, the walls of 1400 of which provide a very large filter surface area. It would not be possible to incorporate such a conventional monolith into the regenerating apparatus of '07008.

SUMMARY OF THE INVENTION

It is an object of the present invention to provide a self regenerating particulate filter apparatus and method which mitigates the above disadvantages, to provide a self-regenerating particulate filter apparatus which is relatively practicable, economical and compact to manufacture and install.

It is a particular object of the present invention to provide a self-regenerating particulate filter apparatus which is able to autoselectively sense and oxidize trapped particulates even at low levels of particulate loading of the filter.

It is a further object to provide a self-regenerating particulate filter apparatus which will operate without any special apparatus for modifying the temperature or oxygen content of the exhaust gases or the oxidation temperature or other characteristics of the particulates.

It is a further object to provide a self-regenerating particulate filter apparatus which requires no exhaust back-pressure or temperature sensors nor any external control or timing devices.

It is a further object to provide a method for the operation of an autoselectively self-regenerating particulate filter apparatus.

According to the invention, an apparatus for removing particulates from a gas stream such as an exhaust stream of an internal combustion engine comprises a filter through which gas may be caused to flow, at least one first electrode, for producing an atmospheric glow discharge located near to but spaced apart from the filter, and at least one second, counter electrode, the said first and second electrodes being connected to an AC voltage supply generating an AC voltage in a frequency within the range of 1 kHz to 200 kHz.

As has been noted, for efficient oxidation the particulate must be at a temperature of at least 550° C. Since such levels of exhaust gas temperature are not encountered throughout all engine operating conditions, extra energy must be put into the exhaust gas stream, the filter or the trapped particulate itself for its effective temperature to be raised above 550° C. The apparatus of the present invention provides the required extra energy by an electrical input of relatively low power consumption in the form of an atmospheric glow discharge.

The invention permits the automatic regeneration in use of a particulate filter, for example of a type including a ceramic monolith. Capacitive coupling combined with high electric field strength enables the deposited particulate to be autoselectively sensed by the system, and the particulate to be oxidized rapidly during a discharge almost the moment it arrives on the filter surface, so that the invention ensures efficient oxidation of particulate at relatively low levels of particulate loading within the filter. Thus there is no requirement to provide pairs of filters in parallel, each one of which is alternately bypassed for regeneration in situ, as required by some conventional systems, and the filter may be smaller than conventional since it will not be allowed to have a particulate build-up which could lead to high levels of exhaust back-pressure and/or damage to the filter.

The frequency of operation of the AC source is of particular importance in determining the efficiency of operation of the device. The present invention uses frequencies which are relatively low. Considerable advantages particularly in relation to cost, size, and ease of fitment to a vehicle can arise from the use of lower frequency sources, which can be relatively easily and cheaply generated with compact, reliable and robust components. At higher frequencies the cost and complexity are greater and the circuits generally less robust. These factors determine the upper limit of optimum frequency range. AC sources of 200 kHz or less are used, and sources of 50 kHz or less are preferred to maximize use of solid state technology.

By contrast, at lower frequencies capacitive coupling of the discharge to the filter, which decreases as the frequency decreases, is less effective. The invention takes advantage of the fact that significant capacitive coupling is produced at considerably lower frequencies than has been suggested in the prior art. Nevertheless, if frequencies are too low, the reactance of the capacitive path becomes relatively high, and in order to function the apparatus is likely to require to be heavily loaded, and would not be expected to work at low loadings due to the low capacitive couplings. The present invention is intended to provide stable and efficient regeneration of the filter at relatively low loadings, and therefore frequencies of operation below 1 kHz are not generally considered desirable, and frequencies above 10 kHz are likely to be preferred.

It is desirable that the frequency of operation of the AC source lies outside the human aural audible range. In consequence, a preferred frequency range for the voltage source is 18 kHz to 30 kHz, more preferable 20 kHz to 25 kHz, with frequencies of around 20 kHz being shown to be particularly effective.

The voltage source preferably provides an open circuit output voltage of between 5 kV and 25 kV, with an open circuit voltage output of around 10 kV being particularly preferred.

Preferably, the or each first electrode is situated at a first end of the filter. The or each counter electrode is spaced away from the or each first electrode. The or each counter electrode is preferably situated in a location which lies downstream in use from the or each first electrode, and may be located at the side (e.g. radially disposed) or at a downstream end of the filter. The or each second electrodes is preferably situated adjacent to and may be in electrical contact with a second downstream end of the filter.

The electrodes, and in particular the first electrode(s), which generate the atmosphere glow discharge, may comprise point electrodes. The electrodes are preferably stabilized by resistors.

The invention covers embodiments in which a single first electrode and a single counter electrode are used, although in some applications it may be preferred that a plurality of counter electrodes and/or a plurality of first electrodes are used.

The or each first and/or second electrodes may comprise a plurality of discharge locations. Such a plurality of discharge locations may be provided by means of an array of point electrodes. Alternatively, one or more plate electrodes may be provided, each of which plate electrodes comprises a conducting plate any part of the surface of which may provide a location for the discharge. Alternatively, one or more network-like electrodes may be provided, in the form of a perforated sheet of conducting material or a wire mesh of conducting material. The conducting material in the above cases preferably comprises metallic material, such as for example copper. Combinations of these types of electrode may be applicable to particular applications.

An alternative form of electrode which may be practicable depending upon the filter material may be provided in the form of a layer of conducting material coated on or impregnatedly bonded to an end face of the filter. Such a surface electrode may be formed by dipping part or all or an end of the filter into a bath of suitable conductor, such as molten silicon, such that a small quantity is absorbed in to the end face to form a discrete and securely bonded surface electrode layer, or by spraying or otherwise coating part or all of the end of the filter with a conductor. Control of configuration and/or composition of the conductor provides a means of electrode stabilization and control of performance.

The present invention is not specific to a particular type of particulate filter, and any filter design which generally removes particulates from a gas flow by trapping the particulates on a surface such as a ceramic surface may be utilized in accordance with the invention. For example, filters may comprise ceramic fiber, foam, membrane, sheet or pad devices. Nevertheless, it is a particular advantage of the present invention is that it allows the use of conventional monolithic particulate filters. Thus, in accordance with the invention, the filter preferably comprises at least one monolith comprising at least one tubular cell defined by a porous ceramic wall, and preferably a plurality of such cells each so defined and having alternate ends blocked off, so that the ceramic walls act as a filter surface in a manner which will be familiar from conventional monolith filters.

As has been indicated, the apparatus of the present invention will efficiently auto-selectively seek and oxidize deposited particulates within the monolith. In consequence, because back pressure can be minimized a filter in accordance with the invention may be smaller that might hitherto have been the case, and in particular a monolith may be significantly shorter than that normally required by conventional filter apparatus. Conventional monoliths may function with a design loading of as high as 90% prior to regeneration, and hence with as little as 10% of clean surface area available. Therefore, although a lower limit to monolith size is still mandated by the need for sufficient porous wall surface area for the exhaust gases to pass through, a filter in accordance with the present invention will function efficiently where the filter comprises a monolith having a correspondingly reduced depth in comparison with conventional filters. For example, a depth in the range of 10 mm to 25 mm, in comparison with the sizes of the order of 100 mm or more encountered in conventional devices, may be appropriate.

To minimize problems of gas flow turbulence, the apparatus may further include a gas flow tube stack, comprising a plurality of tubular cells, placed in axial alignment with but spaced apart from and upstream of a first end of the monolith. A surface electrode may be provided by impregnatingly bonding or depositing a layer of conducting material on a portion of the tube stack.

The filter and associated apparatus may be mounted within a filter body, which body is provided with apertures for the ingress and egress of flowing gases such as exhaust gases. The filter body may itself form or integrally include the counter electrode, either radially or at a downstream end of the filter. Such an arrangement allows control over the direction of gas flow for optimum performance. For example, to avoid problems which may arise where discharges do not reliably penetrate fully through large monoliths, it may be desirable to position one or more monoliths within a filter body such that gas flow as it enters the body is in a direction lateral to the direction of gas flow through the monolith. In this way, the overall surface area presented by the monolith can be increased without increasing the through-depth of the monolith, thus obviating discharge penetration problems associated with excessively large monolith depth.

In accordance with a further aspect of the invention, a method of removing particulates from a gas stream comprises causing the gas to flow through a filter so that particulates are separated from the gas flow and trapped by the filter, positioning at least one first electrode near to but spaced apart from the filter, providing at least one counter electrode, and applying an AC voltage at a frequency in the range of 1 kHz to 200 kHz between the electrodes so as to generate an atmospheric glow discharge from the at least one first electrode.

In accordance with the method, the trapped filter particles are ignited and oxidized in situ, with the advantages outlined above in the description of the apparatus. A safe and effective low power source is used, and the method is applicable to conventional monolith-type filters. Further preferred features of the method will be readily understood by the skilled person by analogy with the features above described of the filter apparatus.

BRIEF DESCRIPTION OF THE DRAWINGS

By way of example, the invention will be described with reference to the accompanying drawings, of which.

DETAILED DESCRIPTION

Figure 1:
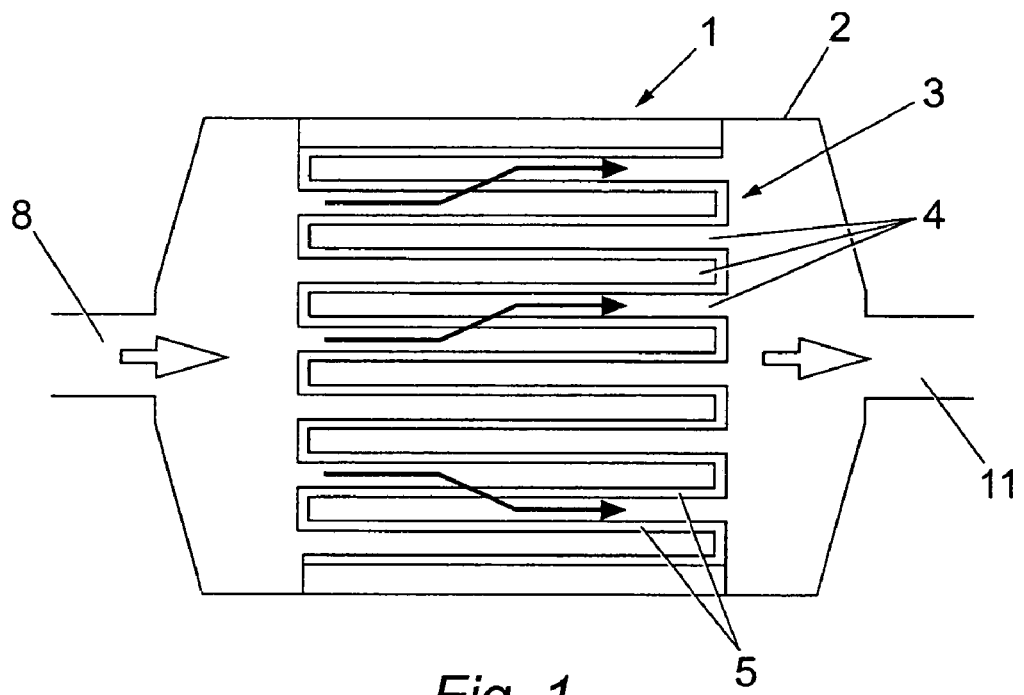
FIG. 1 is a cross-sectional side view through a conventional particulate filter body and monolith apparatus.
Figure 2:
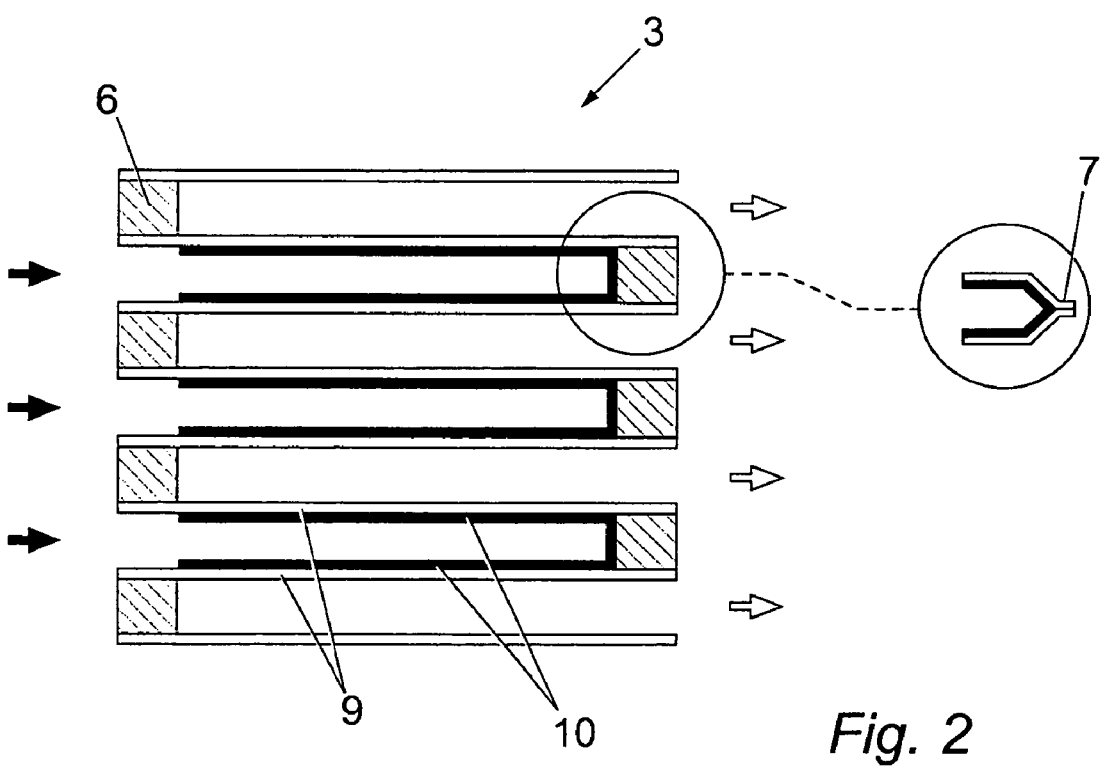
FIG. 2 is a cross-sectional side view through a portion of the conventional monolith of FIG. 1 showing a heavy loading of particulate.

Referring to the drawings, FIGS. 1 and 2 show a conventional particulate filter 1 including a body 2 generally enclosing a monolith 3 which in turn includes a plurality of tubular cells 4 each defined by a porous ceramic wall 5 and each having an alternating end blanked off by a ceramic plug 6. It is also known, but uncommon, for each alternating end to be blanked off by crimping 7, as shown in the optional view within FIG. 2.

Exhaust gases entering the filter via an inlet port 8 are compelled to pass into alternate cells of the monolith and through a corresponding wall 9, with up to 90% of particulate mass thus being filtered by deposition on an inner wall surface 10. The cleaned exhaust gases exit the filter via an outlet port 11.

Conventionally, the filter would be regenerated by oxidation of the collected particulates, either at set intervals or continuously, resulting in their conversion into small amounts of carbon dioxide. The conventional apparatus for initiating and controlling oxidation is not shown in the figures and is not required for the present invention.

The present invention relates to the automatic regeneration in use of a particulate filter of a type including a ceramic monolith, the deposited particulates being autoselectively sensed and oxidized at an ultra-low level of particulate loading within the filter. As a result, relatively small filters may be used.

The apparatus of the present invention provides the required extra energy for rapid and efficient oxidation of trapped particulate by an electrical input of relatively low power consumption in the form of an atmospheric glow discharge as will become clear.

Figure 3:
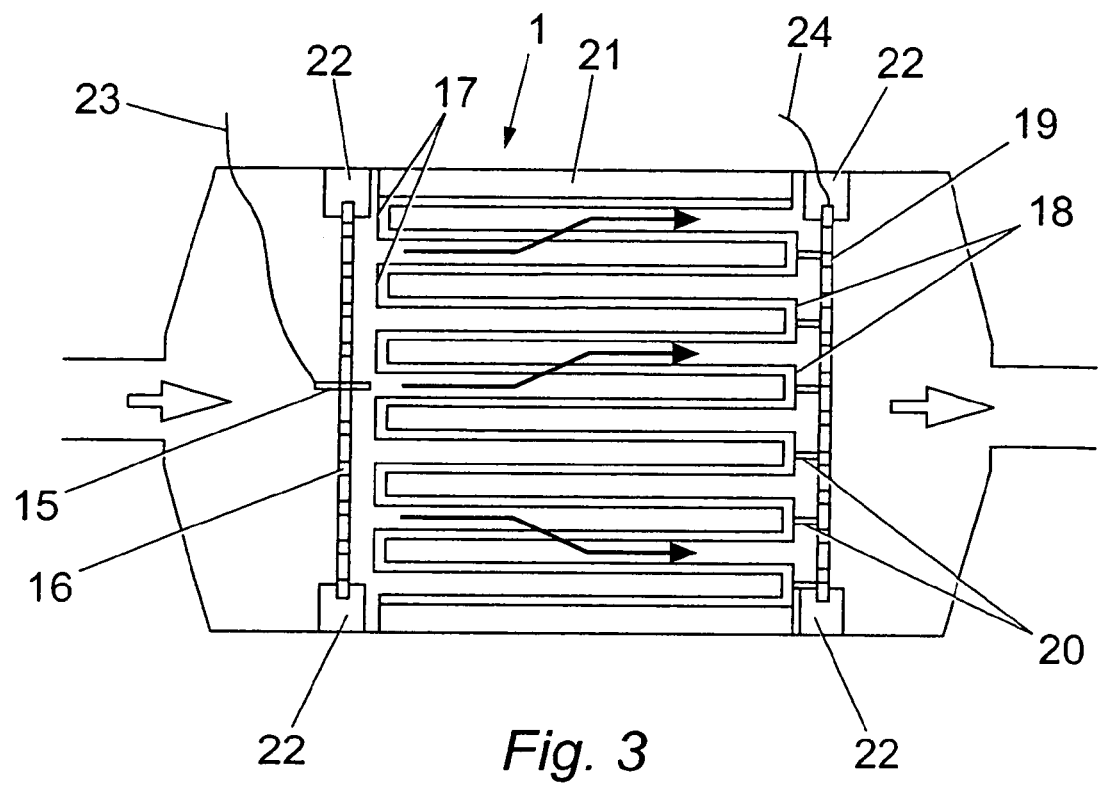
FIG. 3 is a cross-sectional side view through an apparatus with a point electrode in accordance with a first embodiment of the present invention.

FIG. 3 relates to an apparatus of a first embodiment of the present invention in which a point electrode 15 is held by a support means 16 axially spaced apart from a first end 17 of the monolith, for example by a distance of between 4 and 6 mm. The support means 16 is perforated to permit the passage of exhaust gases therethrough.

A counter electrode is provided at a second (downstream) end 18 of the monolith and may comprise individual electrodes (not shown) but is in the example provided in the form of a perforated or mesh plate 19 located axially adjacent to, and in electrical contact with, the second end of the monolith. In the embodiment the plate 19 is not directly in contact with the monolith but is closely spaced apart from the monolith, for example by a distance of up to 4 mm, and connected thereto by electrical connections 20. The counter electrode plate 19 is formed from perforated or meshed electrically conductive material such as steel or copper.

The monolith may be supported within the filter body by an electrically insulated mounting sleeve 21. The electrode support means 16 adjacent to the first end of the monolith and the plate 19 adjacent to the second end of the monolith are supported within the filter body by electrically insulating mountings 22. Alternatives, for example support by the monolith (not shown) will be readily apparent. Electrical feed and return conductors 23, 24 are connected to the electrode and the screen and taken out of the filter via apertures (not shown).

Figure 4:
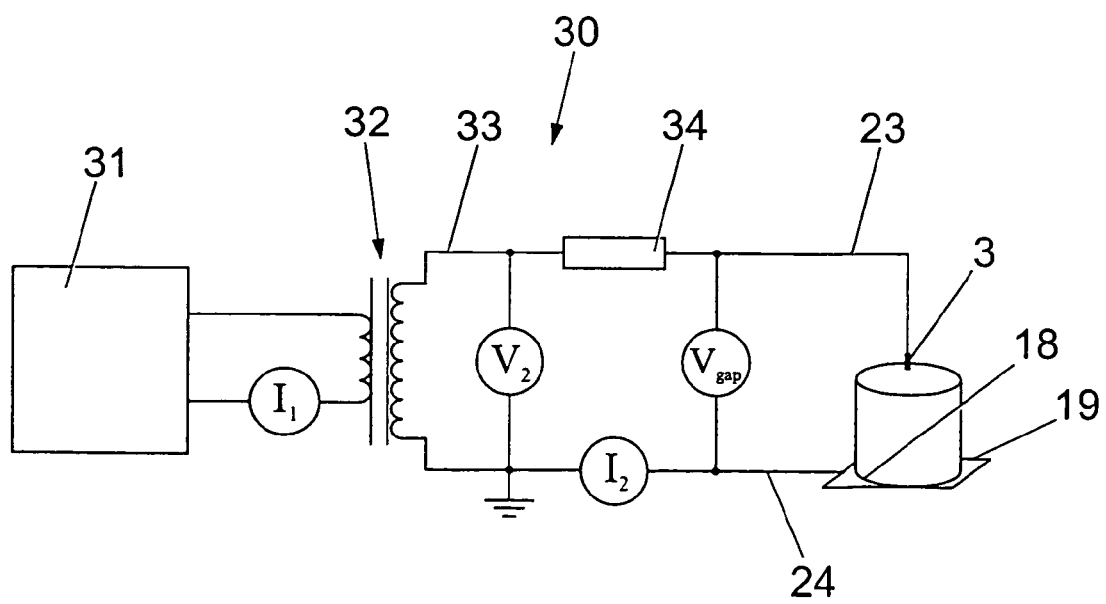
FIG. 4 is a diagram of an experimental apparatus and circuit for a single atmospheric glow discharge derived from a 230 volt power supply in a laboratory.

An experimental laboratory apparatus 30 operating from a 230 volt power supply 31 is shown in FIG. 4. The power supply generates short square-wave pulses at a frequency of 20 kHz with a duration of about 12μ and a zero voltage period of about 13μ. A ferrite core transformer 32, wound to have a low self-inductance, steps up the output voltage to 10 kV. The frequency of 20 kHz is outside of the normal human audio range upper limit of 16–18 kHz and is a relatively safe frequency in conjunction with the current flow of the apparatus.

It was determined that the apparatus would also work effectively at higher frequencies, for example 38 MHz, but 20 kHz was selected as a preferred frequency because of its human comfort and safety benefits and its practical advantages. This preferred frequency has a strong advantage over higher frequencies which would be expensive to achieve at the necessary power levels and which would require circuits generally less robust and which cannot readily be miniaturized.

A side 33 of a secondary winding of the transformer is connected to ten 47Ω, 10 W, low inductance thick film resistors to limit the discharge current. The thick film resistors minimize unpredictable increases in resistance due to skin effect at high frequency which could affect accuracy of measurement during testing and their low inductance reduces parasitic oscillation. Spirally-wire-wound resistors were found to give adverse skin-effects.

The monolith 3 used for the experimental laboratory work was a standard unit of 145 mm diameter and 150 mm length constructed from cordierite. For convenience in the initial experimental apparatus, the monolith was placed axially upright with the second end 18 bearing on the plate 19.

The current in primary circuit I1 was measured with a clip-on current probe having a frequency response of DC to 100 kHz and the output was recorded on one channel of a digital oscilloscope sampling at 5 megasamples per second. The secondary current I2 was obtained by measuring the voltage drop across a 2Ω non-inductive resistance (not shown) on the earthed side of the output. The voltage output of the secondary winding of the transformer and the voltage across a gap between the discharge side of the electrode 15 and the monolith 3 were measured with a high voltage probe with a bandwidth of 75 MHz. The oscilloscope voltage probe was wrapped in aluminum foil to act as a shield against electromagnetic pick-up from corona discharge.

Figure 5:
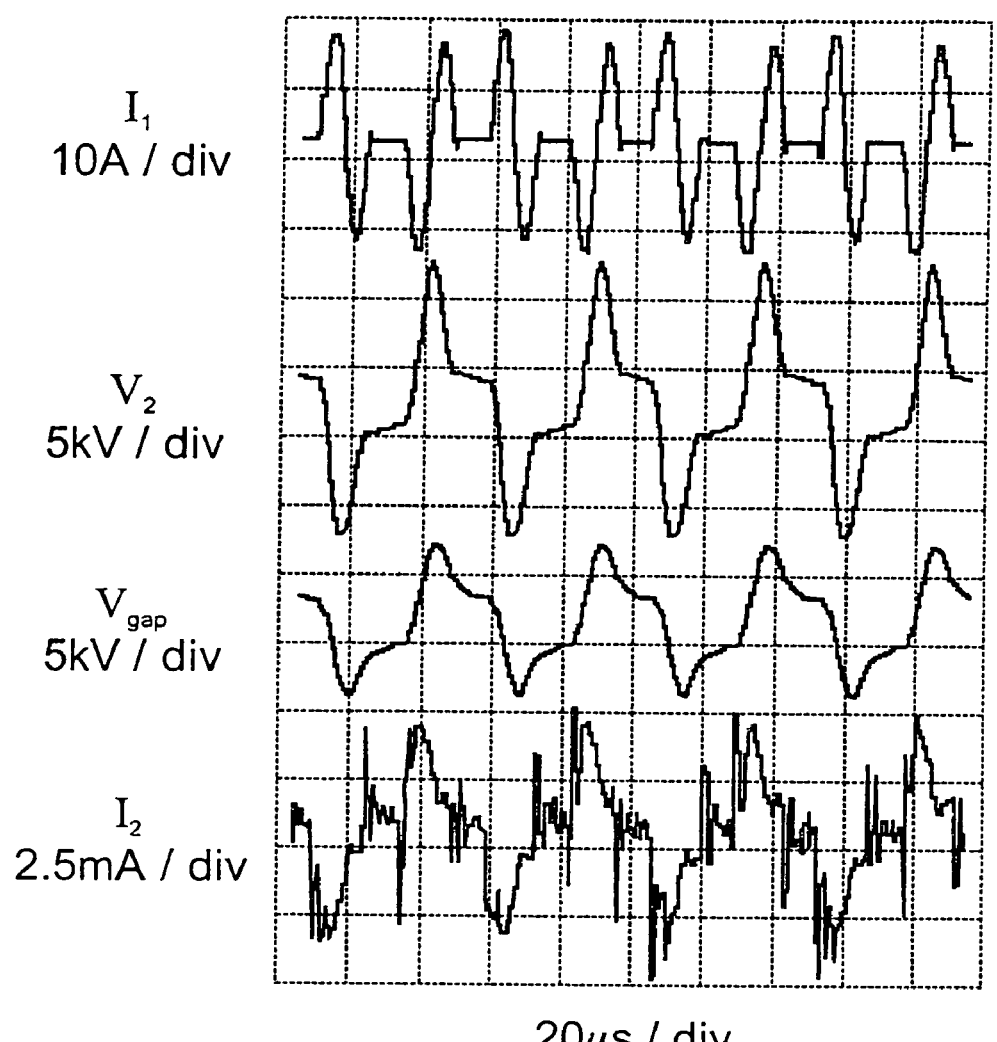
FIG. 5 is a diagram of discharge circuit waveforms on a loaded monolith in the experimental apparatus and circuit of FIG. 4.

The voltage and current waveforms for a discharge across a 4 mm gap to the monolith are shown in FIG. 5. As a positive voltage pulse was applied to the transformer, there was a current pulse of approximately 13 A followed by a negative current pulse. This can be attributed entirely to the behaviour of the transformer on no-load which is dominated by its self-capacitance. The total current in the secondary winding was about 25 mA mainly due to corona and capacitive current. Corona effects in the apparatus were minimized by avoiding sharp edges on conductor ends.

The voltage across the secondary winding rose to 10 kV in 5 μ before falling to 2 kV for the remainder of the pulse. The same pulse shape was seen for the voltage measured across the gap with a peak voltage of 5 kV. At the point where the gap voltage begins to rise, the current in the secondary circuit rises sharply to a peak of 3.5 mA. This rise precedes any measured significant voltage rise and is probably due to the capacitance of the supply circuit, including the transformer 32. The small current measure suggests that most of the 25 mA derived above goes into the corona and capacitive current to earth from the transformer windings and other parts of the circuit. The discharge currently of 3.5 mA implies that the total impedance of the circuit including the resistors could be as high as 2.8 MΩ. The low value of discharge current estimated is consistent with the power loss and hence current determined from the power loss in the thick film stabilizing resistors 34.

Since typical resistive discharge traces were not seen (i.e. initial rise in voltage to threshold at which occurs a rapid fall-off to low constant voltage) then the monolith was exhibiting some capacitance as expected.

The voltage spikes preceding each rise in current were caused by the onset of corona. The supply circuit behaved more as an electrical transmission line with distributed values of capacitance to earth and resistance corresponding to the corona loss. The monolith itself can behave like a transmission line with discharges in series with resistance and capacitance.

Figure 6:
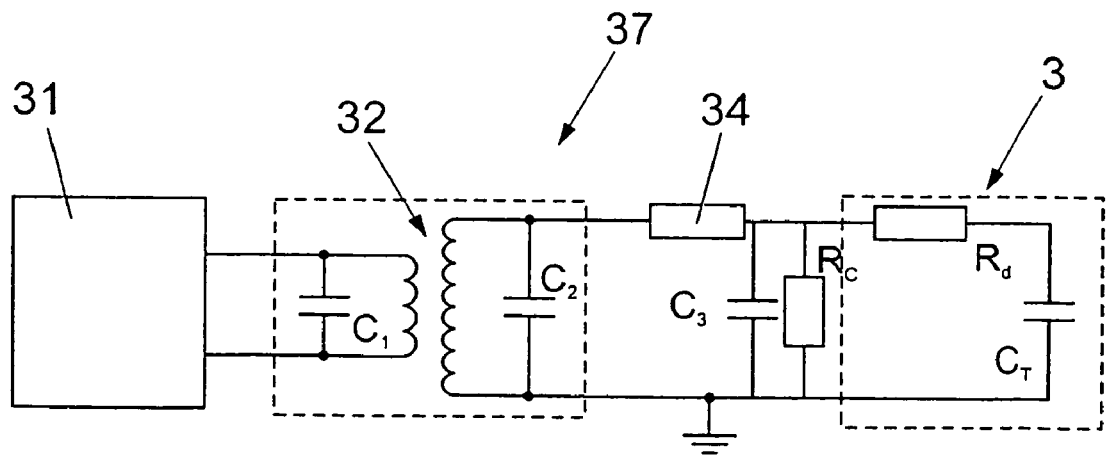
FIG. 6 is a diagram of a simplified circuit with lumped components equivalent to the experimental circuit of FIG. 4.

The results from the experimental apparatus were used to derive a simplified equivalent circuit 37 using lumped components as shown in FIG. 6. The transformer 32 has significant capacitance (C1 and C2) because of the geometry of the low inductance windings. The discharge to the monolith 3 behaves as a resistor Rd connected in series with a small capacitance CT. C3 represents the capacitance to earth, Rc the parallel resistance of the connecting circuit of the supply and Rd the corona discharge.

Figure 7:
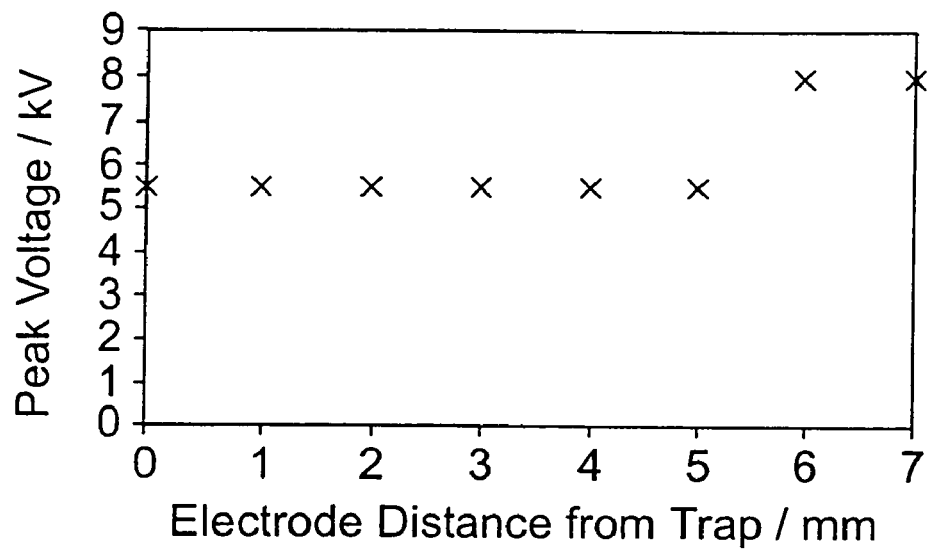
FIG. 7 is a table showing the relationship between the electrode distance from the monolith and the peak voltage.

FIG. 7 shows the relationship between the peak gap voltage measured against electrode height above the monolith. With 10 kV pulses from the secondary winding of the transformer, breakdown and discharge occurs only when the electrode height is less than 6 mm. The step in the gap voltage where it is constant with height below 6 mm also suggests that the monolith behaves as a capacitor.

Figure 8:
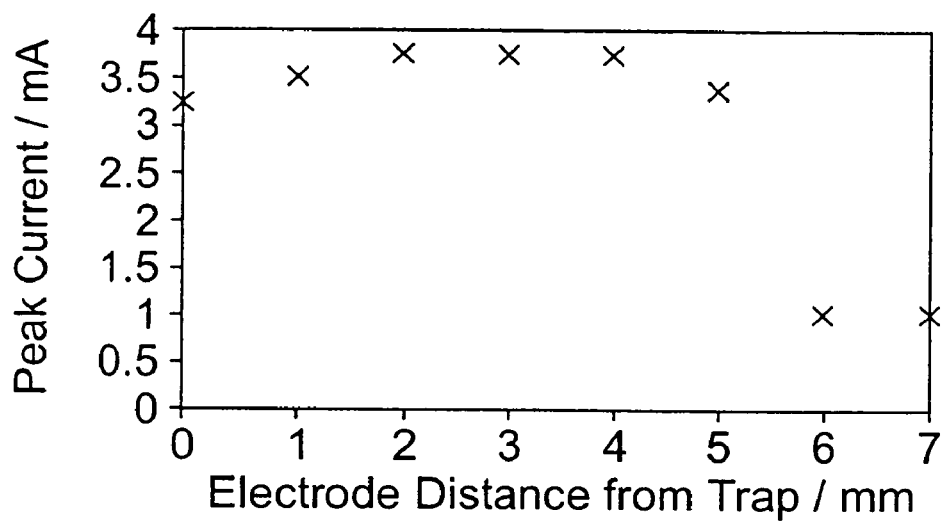
FIG. 8 is a table showing the relationship between the electrode distance from the monolith and the peak current.

FIG. 8 shows the variation of the peak current with electrode height. Again a clear step is visible corresponding to the onset of discharge, the discharge only occurring and causing current flow below 6 mm. The small current above 6 mm can be attributed to the effects of corona.

Figure 9:
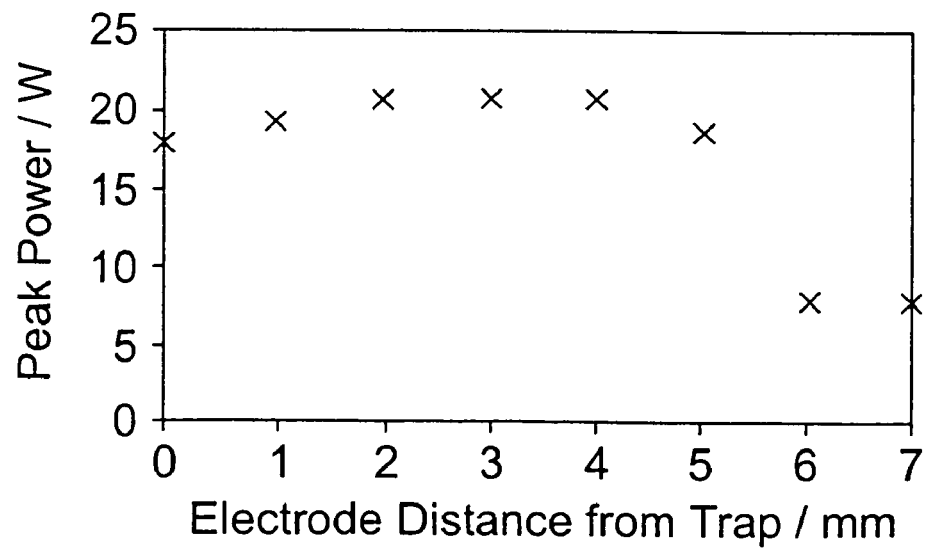
FIG. 9 is a table showing the relationship between the electrode distance from the monolith and the peak power.

FIG. 9 shows the estimated peak power of only the discharge (i.e. ignoring corona) calculated from the above measurements. While the discharge occurs, it is estimated that the peak power is about 20 W. The mean power (r.m.s.) however is likely to be considerably less than this due to the duty cycle of the system. It is estimated here that the system has a duty cycle of 50% corresponding to 10 W.

Figure 10:
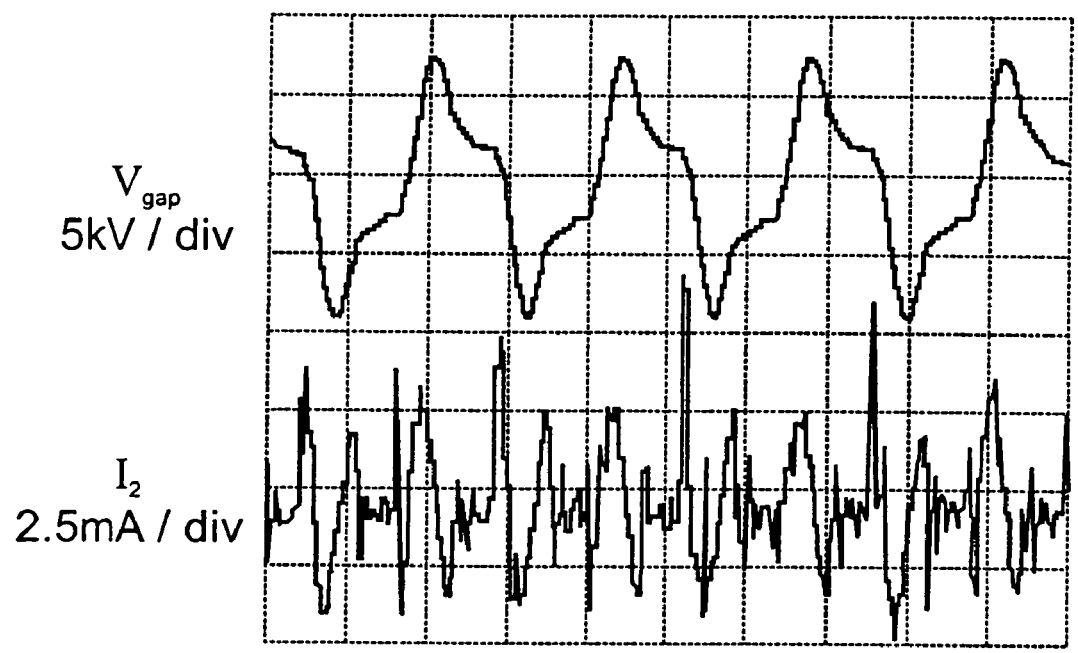
FIG. 10 is a diagram of discharge circuit waveforms on a clean monolith in the experimental apparatus and circuit of FIG. 4.

FIG. 10 shows the electrical measurements made on a clean monolith with an electrode height of 4 mm, in which no apparent discharge is present. The many spikes apparent indicate that corona current is dominant. Other longer period fluctuations are due to voltage pick-up.

For evaluating the inventive method, the monolith 3 of the experimental apparatus was heavily loaded in particulate from a diesel engine run under high load. As the heavily loaded monolith became progressively cleaner during testing, proving of the apparatus and method at various levels of particulate loading was automatically facilitated. Further tests were then carried out with a clean monolith in order to provide validation of the apparatus and method under extremes of particulate loading.

For the tests, and with reference to FIG. 11, the monolith 3 was sectioned and positioned so that discharge activities could be visually observed. A glass slide (not shown) was attached to the monolith to provide a viewing window but was not considered essential. The second end of the monolith was electrically connected to the return electrical circuit by means of an electrically conductive mesh in electrical contact with the monolith as already described in conjunction with FIG. 4.

A video recording was taken of the progress of discharges 40 with time, stills from which are represented by the line drawings of FIG. 11. The discharge was observed to seek out particulate deposits 41 over a radius of 7.5 mm and after 13 minutes in conjunction with a fully loaded monolith (FIG. 2) it had cleaned two channels to a depth of 15 mm.

During observations, it was apparent that discharges occurred deep down within the monolith between small breaks in the particulate collections and right down to the screen 19 acting as a counter electrode. Under these conditions, the monolith behaves as a series of capacitors in series with resistive conductive areas corresponding to areas of particulate and resistive electric discharges. A single discharge penetration into the first end 17 of the monolith was observed to be 16 mm, using an electrode 15 axially spaced apart from the monolith by 4 mm.

With a clean monolith, it was found that a very weak cone-shaped corona discharge (not shown) existed around the electrode due to the monolith behaving as a pure capacitor. The corona appears to prepare a path for atmospheric glow discharge by lowering the resistance to the path, thus the discharge is enabled immediately subsequent to trapping of particulates.

The experimental apparatus described above included, for one test, a monolith fully loaded with particulate to validate the apparatus and method under the most adverse particulate loading. It will be understood that this level of loading was for testing purposes only. The invention, unlike prior art arrangements, can operate without requiring high loading levels. In consequence, commencement in use with a relatively clean monolith subjected to a diesel engine exhaust gas flow will avoid a prolonged and continuous regeneration energy requirement over a substantial volume of the monolith, the particulate being targeted by the apparatus at almost the instant of deposition. The current needed for regeneration will depend to an extent upon the level of particulate being deposited.

Figure 12:
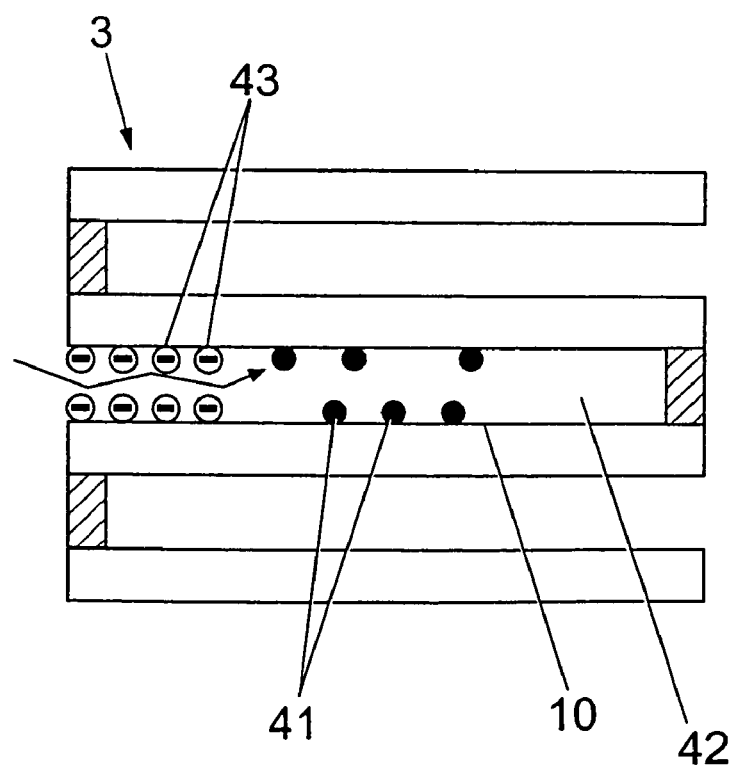
FIG. 12 is a schematic cross-sectional view showing the mechanism of discharge penetration into a cell of the monolith.
Figure 11A:
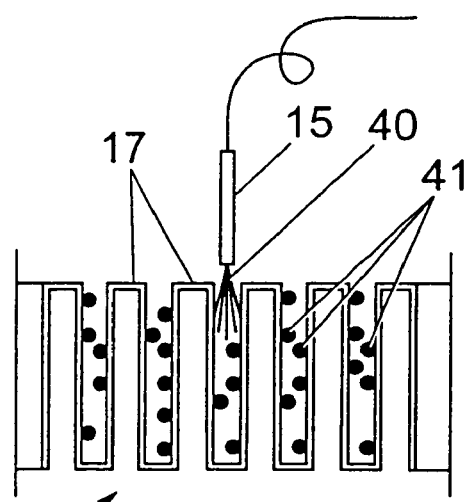
FIG. 11 is a diagrammatic representation of a series of video stills showing, in side view, a single atmospheric glow discharge actively seeking out particulate deposits in multiple localized cells.
Figure 11B:
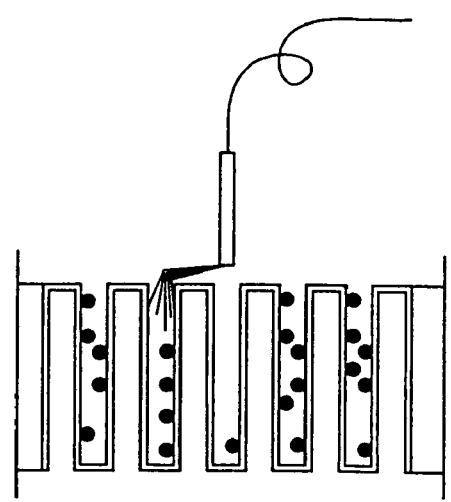
Figure 11C:
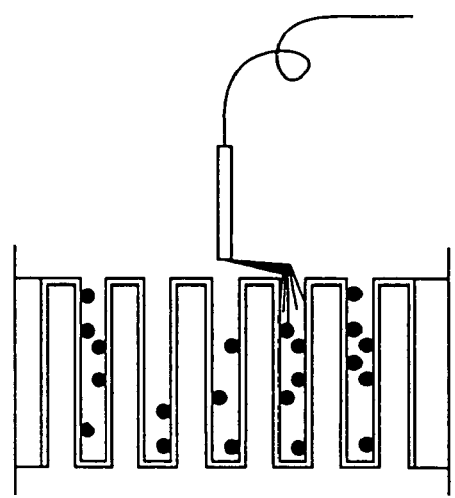
Figure 11D:
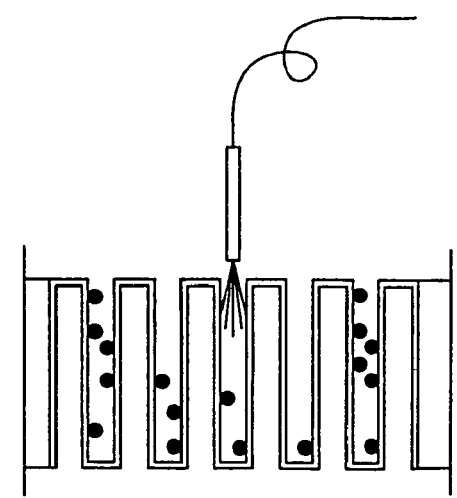

FIG. 12 shows the mechanism of atmospheric gas discharge penetration into the cells of the monolith. As the discharge rapidly seeks out and oxidizes particles 41 deposited on a wall surface 10 out of a cell 42, the local areas 43 where oxidation takes place take on negative charges which direct the discharge further into the cell.

Figure 13:
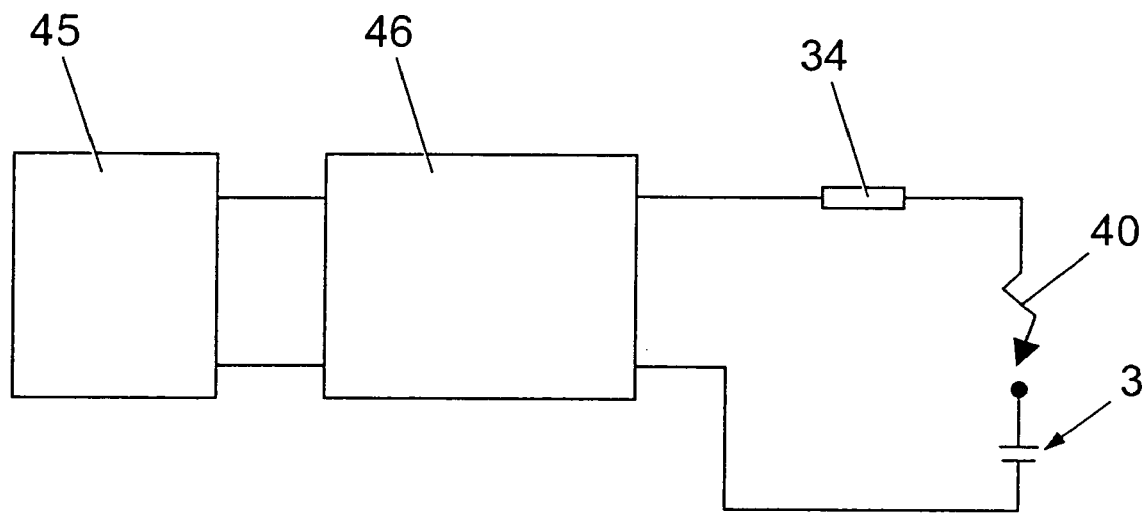
FIG. 13 is a diagram of a simplified electrical circuit for a single atmospheric glow discharge derived from a 12 or 24 volt power supply in a vehicle.

As shown in FIG. 13, the experimental apparatus and method described above may be adapted for use in vehicles by exchanging the 230 volt power supply 31 (FIG. 6) with a 12 or 24 volt direct current (DC) power supply 45 as provided by a conventional vehicle electrical system (not shown) and configuring the power source to provide the required high voltage and preferably 20 kHz frequency output. Also shown in FIG. 13 are the stabilizing resistor 34 of 470 kW preferred value, the discharge 40 and the monolith 3, the latter shown symbolically in its electrical function as a capacitor.

Since the particulate is oxidized rapidly during a discharge almost immediately it arrives on a wall surface of the cell, exhaust gas back-pressure is not allowed to build up and the monolith may be dimensioned smaller than is conventional and therefore be easier to fit into the available space in a vehicle. If desired, an indicator (not shown) could be provided to register to a vehicle operator any failure of the apparatus.

Figure 14:
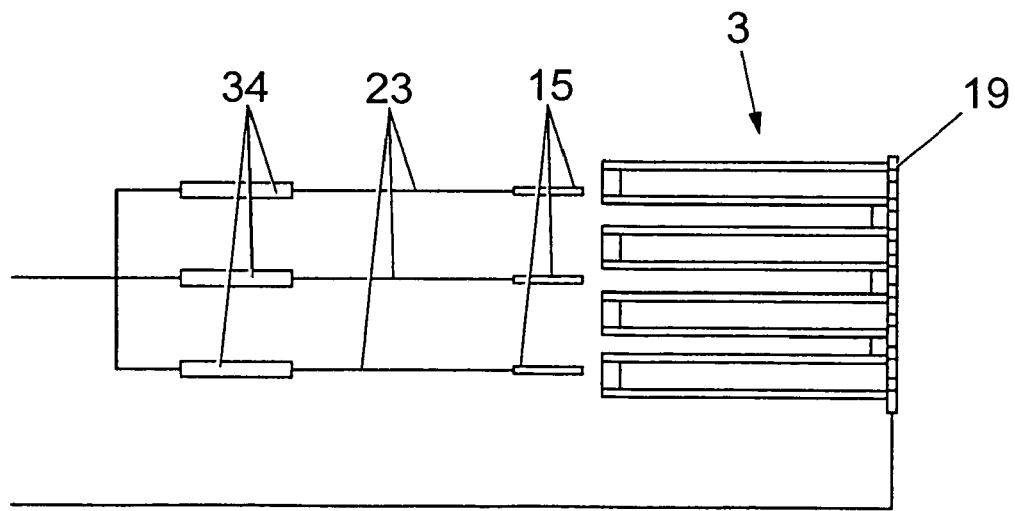
FIG. 14 is a schematic diagram of a multiple point electrode arrangement.

Though an apparatus and method for a single point electrode 15 has been described above, the apparatus may include a plurality of point electrodes. FIG. 14 shows an electrical arrangement for three point electrodes 15, each of which must be electrically stabilized by, for example, a 470 kW resistor 34 in each independent electrical feed conductor 23.

Figure 15:
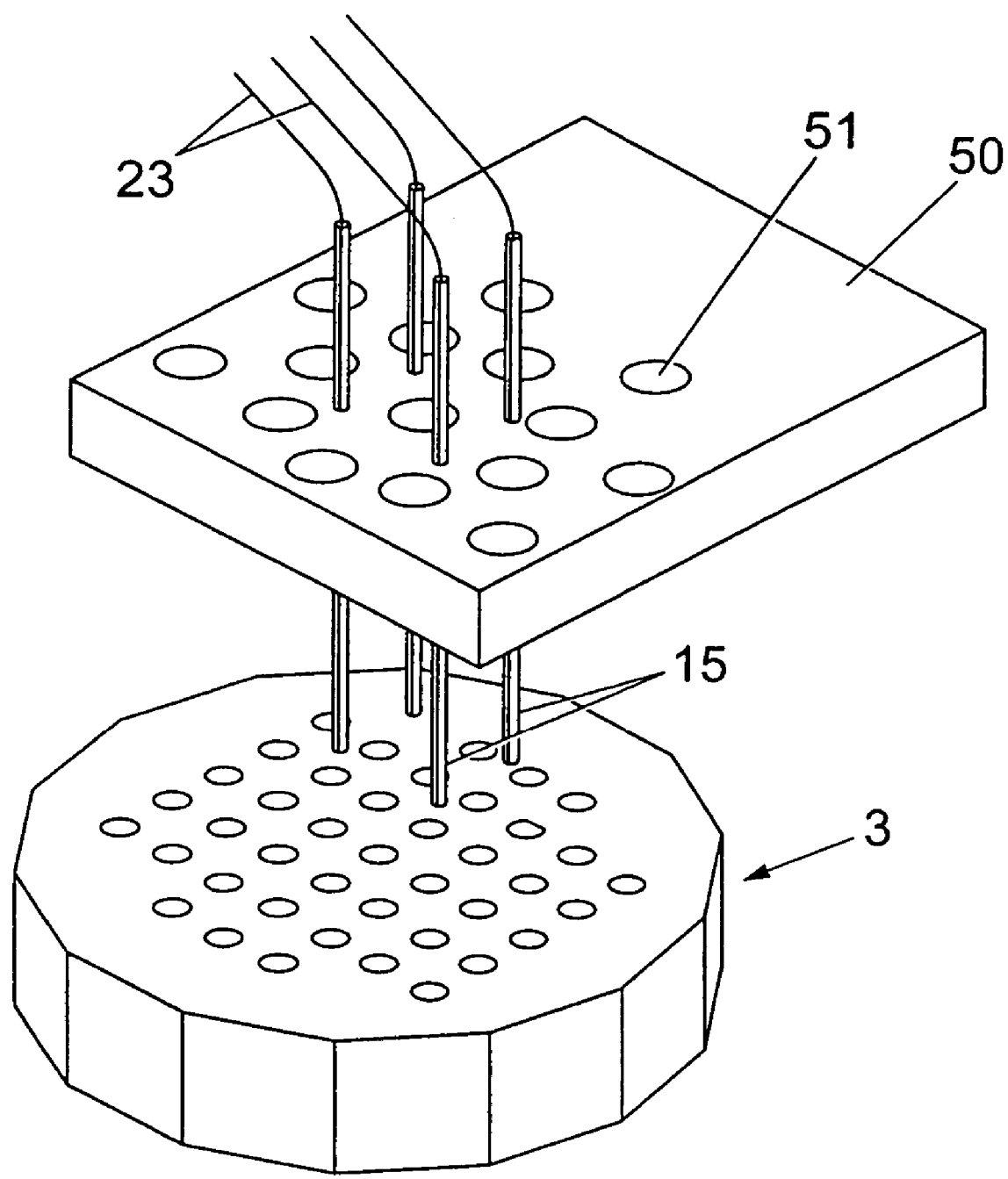
FIG. 15 is an isometric view of a multiple point electrode apparatus.

FIG. 15 shows four point electrodes 15 supported by a support means 50. The support means may be similar in configuration to the single electrode support means 16 in FIG. 3 or may include a gas flow straightening means such as is described with reference to FIG. 19. The point electrodes are radially spaced apart from each other by a distance determined by calculation or experimentation as being the most effective in use. An initial spacing for experimentation purposes might be 10 mm. Perforations 51 are provided for the passage of exhaust gases through the electrode support means 50.

Figure 16:
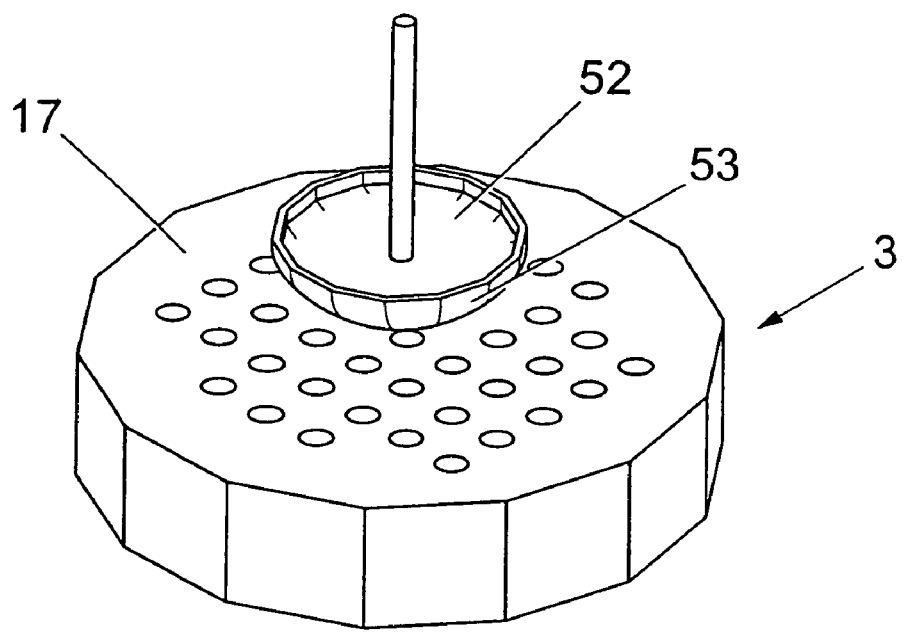
FIG. 16 is an isometric view of a plate electrode apparatus in accordance with a second embodiment of the invention.

In a further embodiment with reference to FIG. 16, a plate electrode 52 is used in place of single or multiple point electrodes 15. The plate electrode is manufactured from an electrically conductive material, preferable metal and for example copper, and has an area approximately corresponding to a target cleaning area (not shown) of the first end 17 of the monolith 3. The plate electrode has a turned-up periphery 53 to avoid unbalanced electrical discharges which could otherwise arise. The plate electrode may be provided in multiple form (not shown) in a similar manner to the multiple point electrode arrangement described in relation to FIG. 15, with the number of plate electrodes depending at least upon the total area of the monolith to be cleaned and their impact on gas flows into the monolith In an experimental apparatus including the plate electrode 52 and a heavily loaded monolith 3, atmospheric glow discharges were observed to auto-selectively transfer between the plate electrode and the corresponding target cleaning area of the monolith according to the build-up of particulate, the heaviest build-ups being targeted first. It was observed that the electrical discharges were able to move about over the whole area of the surface of the plate electrode 52.

Figure 17:
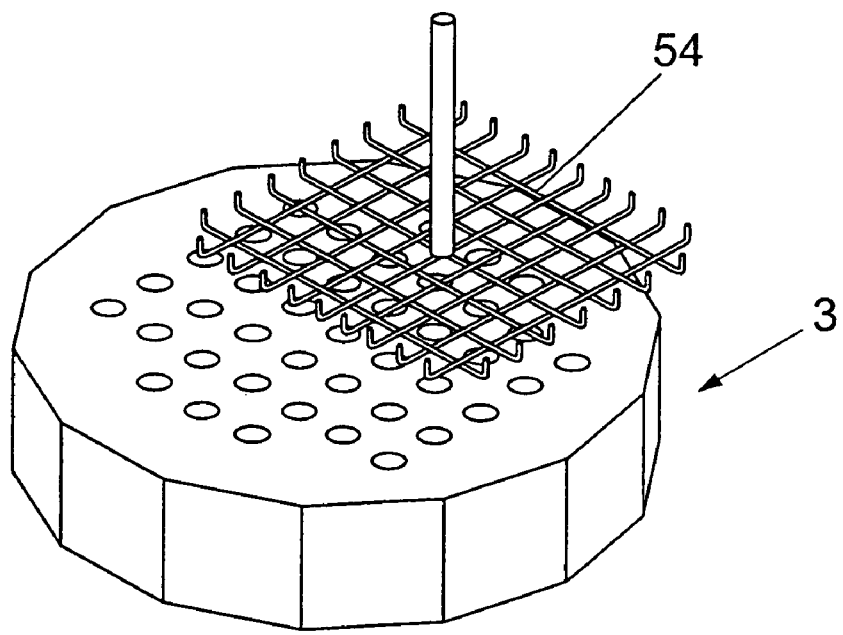
FIG. 17 is an isometric view of a mesh electrode apparatus in accordance with a third embodiment of the invention.
Figure 18:
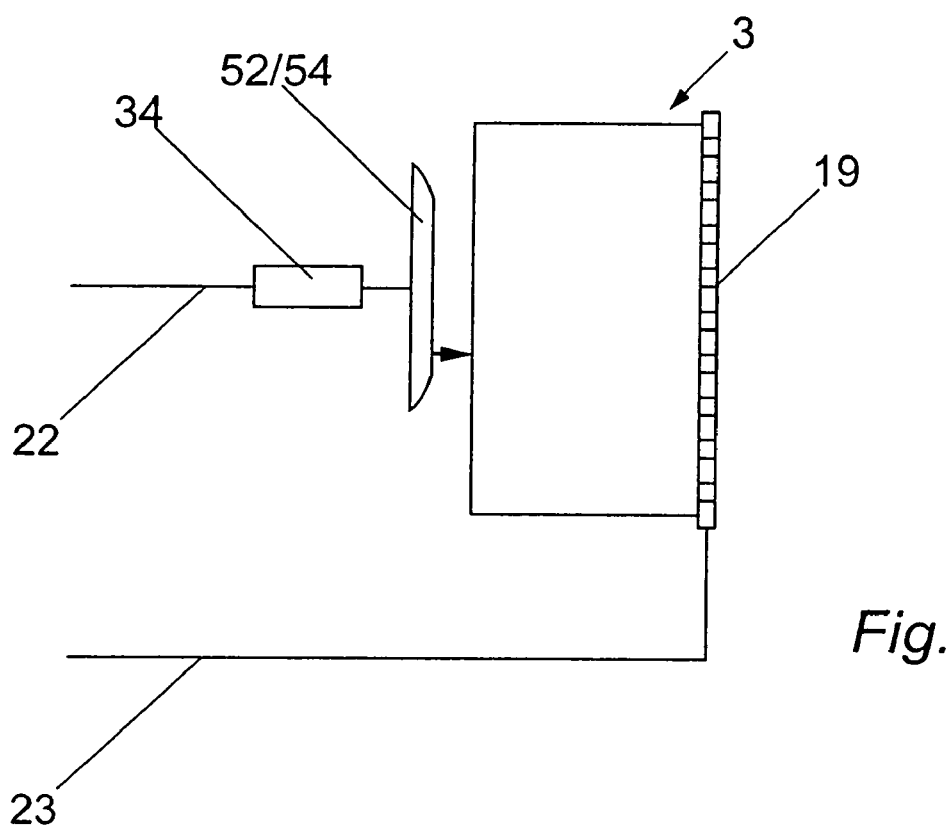
FIG. 18 is a diagram of a simplified electrical circuit for atmospheric glow discharges using a plate or mesh electrode.

In a further embodiment with reference to FIG. 17, the plate electrode 52 of FIG. 16 was replaced with a mesh electrode 54 of similar area. The mesh electrode is manufactured from preferably metal and may be in the form of a perforated sheet-like material but it is preferably in the form of a wire mesh material. An advantage of the mesh electrode 54 over the plate electrode 52 is a much smaller obstruction to gas flows. FIG. 18 shows a simplified electrical circuit diagram for a single plate or mesh electrode apparatus.

Figure 19:
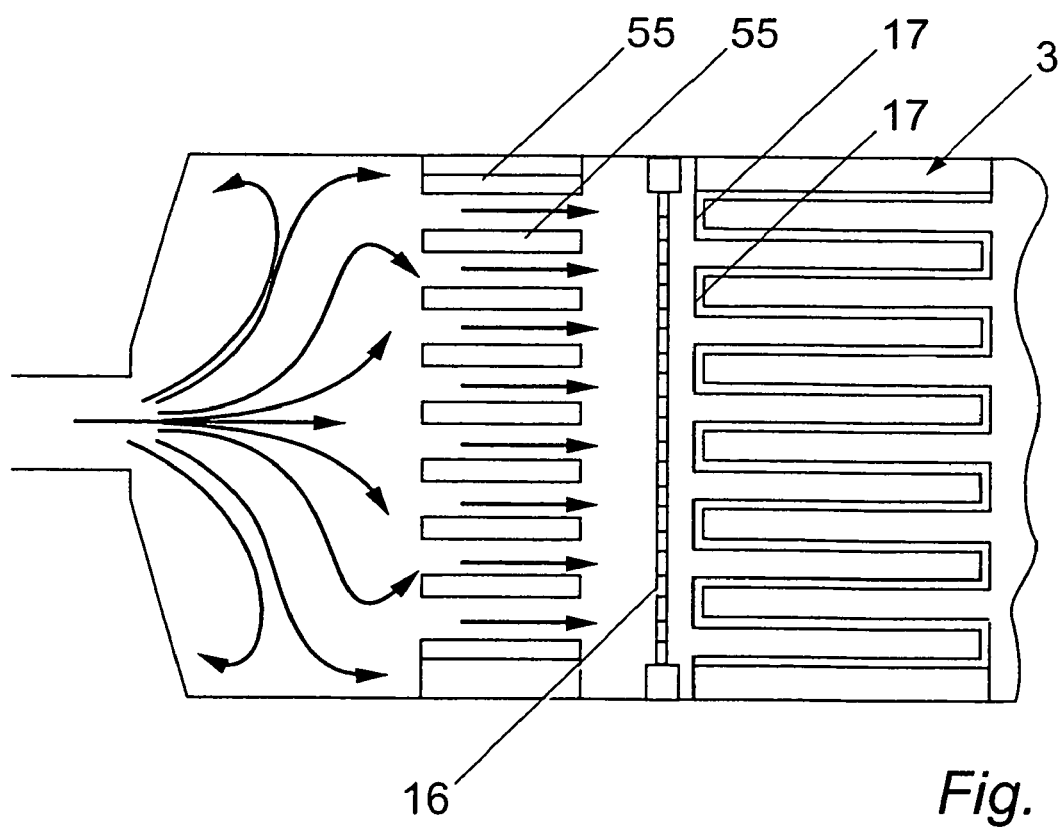
FIG. 19 is a cross-sectional view through a section of the particulate filter including a gas flow tube-stack in accordance with a fourth embodiment of the invention.

In a further embodiment with reference to FIG. 19, where gas flows into the particulate filter 1 of the type illustrated in FIGS. 1 and 3 may be aggressively turbulent, a gas flow tube-stack 55 placed in axial alignment with, but spaced apart from, the first end 17 of the monolith 3 will help to direct the flow and hence will more favorable direct the electrical discharge 40 (FIG. 13). The tube-stack 55 has a length of, in this example, 35 mm and may be configured (not shown) to facilitate mounting of the electrode(s) which will be located between the tube-stack and the first end of the monolith. The tube-stack may be used in conjunction with any of the electrode configurations described herein. Shown in the figure is the support means 16 for single or multiple point electrodes 15 as described with reference to FIG. 3 and FIG. 15. Alternatively, a portion of the tube-stack 55 may be coated or impregnatingly bonded with a layer of conducting material to produce a surface electrode. The surface electrode may be formed by dipping or spraying part or all of the tube-stack 55 using hot molten silicon or other suitable conducting material. In common with the previously described embodiments, the optimum distance between the tube stack surface electrode and the monolith is between 4 and 6 mm.

As already described herein, the apparatus of the present invention in its several embodiments will autoselectively and rapidly seek and oxidize particulates deposited in the monolith with the benefit that the monolith may be significantly shorter than in conventional apparatus so far as allowance for exhaust gas back-pressure is concerned. However, a lower limit to monolith size is still mandated by the need for sufficient porous wall surface area for the exhaust gases to pass through.

Further, although the atmospheric gas discharge of the present invention may break up into smaller discharges between particulate deposits deep down in the monolith, in some configurations of apparatus and particulate deposits, there may occur a situation where the discharges do not reliably penetrate fully through the monolith.

Figure 20:
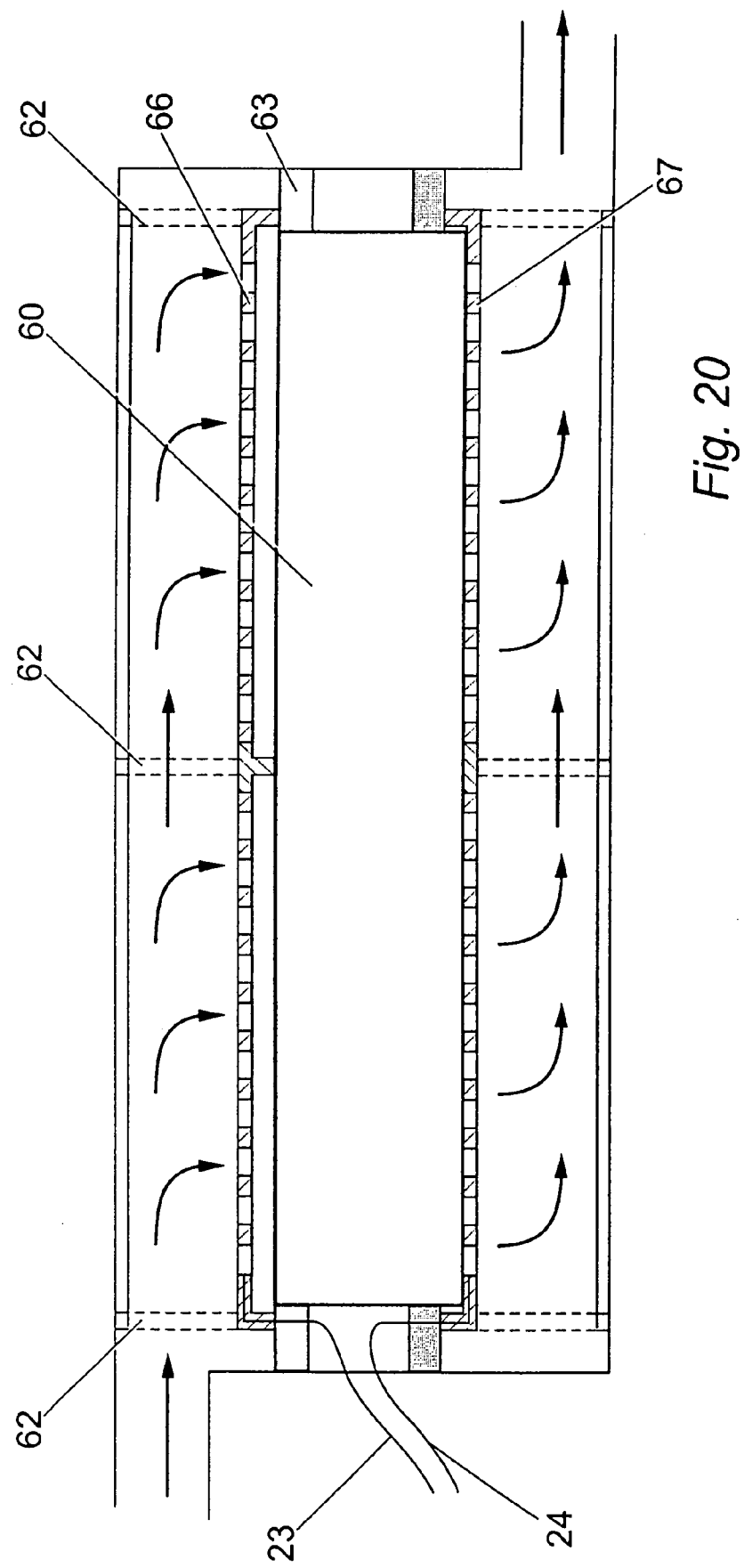
FIG. 20 is a cross-sectional side view of a slab-like monolith particulate filter with mesh electrode and counter-electrode apparatus in accordance with a fifth embodiment of the invention.

FIG. 20 relates to an apparatus of a further embodiment to overcome the fore-mentioned two particular concerns.

In this embodiment, a slab-like monolith 60 (having the general structure of the monoliths illustrated in FIGS. 1 to 3) is positioned within and spaced apart from a filter body by electrically insulating supports 62, 63. The monolith is provided with associated electrodes 66 and counter electrodes 67, preferably in perforated (mesh) form, together with electrical connectors 20 and conductors 23, 24 in general accordance with one or more previous embodiments. For clarity, the electrodes 66 and electrical connection thereto by conductor 23 are shown in the figure in simplified form but may of course be as described in any of the other embodiments of the invention.

The monolith may, if required, be provided with a gas flow straightener as already described with reference to FIG. 19 but not however shown in FIG. 20. The exhaust gases entering the filter will pass through the monolith 60 which, whilst presenting a relatively large cell wall permeable surface area, also provides a usefully short path therethrough to ensure thorough penetration of the atmospheric glow discharges under all conditions of use.

The cells of the slab-like monolith 60 have alternate ends blanked off by crimping rather than plugging (not shown, but refer to FIG. 2) in order to maximize the effective length of each cell. This slab-like topography of monolith would not be acceptable in conventional particulate filters which require monolith cells to be relatively deep in order to provide for an acceptable gas flow when the monolith is holding a heavy particulate deposit.

It should be noted that although the present example includes a ceramic monolith 60 to perform the filtering function it may be practicable to alternatively include a ceramic fiber, foam, membrane, sheet or pad.

Figure 21:
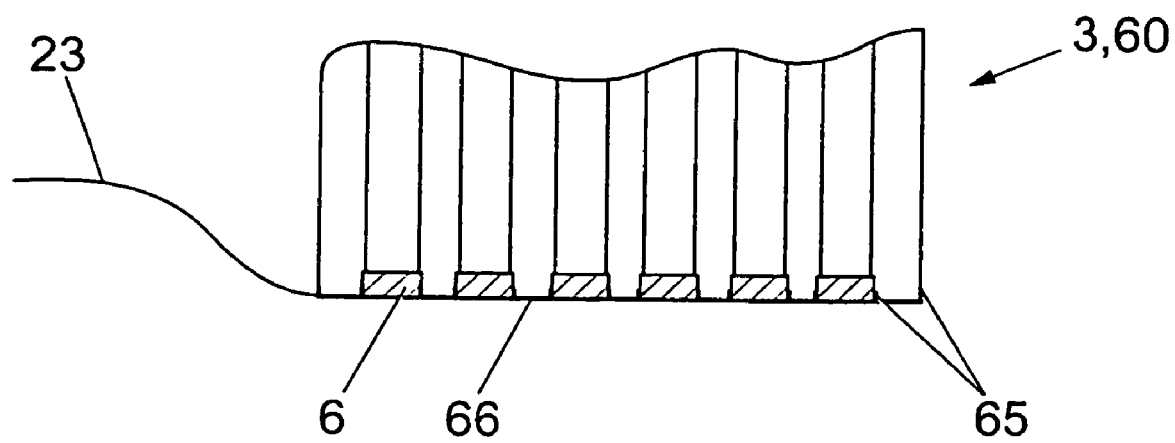
FIG. 21 is a cross-sectional view of a particulate filter apparatus with impregnated electrodes in accordance with a sixth embodiment of the invention.

FIG. 21 shows an apparatus in accordance with a further embodiment of the present invention in which a surface electrode 65 is provided in the form of a layer of conducting material coated or impregnatingly bonded to an end of the porous ceramic monolith 3, 60. As with the surface electrode provided on the tube-stack 55 in the embodiment of FIG. 19, the surface electrode may be formed by dipping or spraying part or all of an end 66 of the monolith using hot molten silicon or other suitable conducting material, a small quantity of which will be absorbed into the end of the monolith and will solidify to form a discrete and securely bonded surface layer.

A downstream end of the monolith is particularly suitable for providing with an impregnated surface electrode which will act in this instance as a counter electrode. The counter electrode may be electrically stabilized by a suitable composition and/or configuration of impregnating material, and may be connected to a return conductor 23 to enable discharges from an electrode of any type already described herein to auto-selectively enter and clean any cell of the monolith.

The autoselectively regenerating particulate filter apparatus and method of the present invention is intended for the exhaust system of diesel-fuelled internal combustion engines and has been primarily described as such but may be adapted for other equipment producing combustible particles.

What is claimed is:

1. An apparatus for removing particulates from a gas stream, comprising:
a filter through which gas may be caused to flow;
at least one first electrode for producing an atmospheric glow discharge located near to but spaced apart upstream from an upstream end of the filter;
at least one second counter electrode, the said electrode being connected to an AC voltage source; and
a gas flow tube-stack placed near to but spaced apart from the upstream end of the filter.

2. An apparatus in accordance with claim 1 wherein the or each counter electrode is spaced away from the or each first electrode and situated in a location which lies downstream in use from the or each first electrode.

3. An apparatus in accordance with claim 2 wherein the or each counter electrode is situated adjacent to and in electrical contact with the downstream end of the filter.

4. An apparatus in accordance with claim 1 wherein at least one of the said first and second electrodes comprises a point electrode.

5. An apparatus in accordance with claim 1 wherein the or each first electrode comprises a plurality of discharge locations.

6. An apparatus in accordance with claim 1 wherein the or each counter electrode comprises a plurality of discharge locations.

7. An apparatus in accordance with claim 5 wherein at least one of the electrodes comprises at least one conducting plate any part of the surface of which may provide a discharge location.

8. An apparatus in accordance with claim 5 wherein at least one of the electrodes comprises a network-like electrode in the form of a perforated sheet or a wire mesh of conducting material.

9. An apparatus in accordance with claim 1 where one of said electrodes comprises a surface electrode in the form of a layer of conducting material impregnatedly bonded to or deposited on an end surface of the filter.

10. An apparatus in accordance with claim 1 wherein the voltage source generates an AC voltage in a frequency range of about 18 kHz to about 30 kHz.

11. An apparatus in accordance with claim 10 wherein the voltage supply generates an AC voltage in a frequency range about 20 kHz to about 25 kHz.

12. An apparatus in accordance with claim 1 wherein the voltage source provides an open circuit output voltage of between about 5 kV and about 25 kV.

13. An apparatus in accordance with claim 1 wherein the filter comprises a ceramic surface upon which particulates may be trapped.

14. An apparatus in accordance with claim 13 wherein the filter comprises a monolith comprising at least one tubular cell defined by a porous ceramic wall.

15. An apparatus in accordance with claim 14 wherein the filter comprises a monolith having a depth of less than about 100 mm.

16. An apparatus in accordance with claim 15 wherein the filter comprises a monolith having a depth in the range of about 10 mm to about 25 mm.

17. An apparatus in accordance with claim 14 further including a gas flow tube-stack, comprising a plurality of tubular cells placed in axial alignment with but spaced apart from and upstream of a first end of the monolith.

18. An apparatus in accordance with claim 17 wherein one of the electrodes comprises a surface electrode in the form of a layer of conducting material impregnatedly bonded to or deposited on a portion of the tube-stack.

19. A method of removal of particulates from a gas stream, comprising:

causing the gas to flow through a filter so that particulates are separated from the gas flow and trapped by the filter;

positioning at least one first electrode near to but spaced apart upstream from an upstream end of the filter;

providing at least one counter electrode;

applying an AC voltage between the electrodes to generate an atmospheric glow discharge from the at least one first electrode; and positioning a gas flow tube-stack near to but spaced apart from the upstream end of the filter.

20. A method in accordance with claim 19 wherein the or each counter electrode is positioned to be spaced away from the or each first electrode and situated in a location which lies downstream of the or each first electrode.

21. A method in accordance with claim 20 wherein the or each counter electrode is mounted in electrical contact with a second downstream end of the filter.

22. A method in accordance with claim 19 wherein the AC voltage is supplied at a frequency in the range of about 18 kHz to about 30 kHz.

23. A method in accordance with claim 22 wherein the AC voltage is supplied at a frequency in the range of about 20 kHz to about 25 kHz.

24. A method in accordance with claim 19 wherein the AC voltage is an open circuit output voltage of between about 5 kV and about 25 kV.

25. An apparatus for removing particulates from a gas stream, comprising:

a filter through which gas may be caused to flow;

an electrode arrangement for producing atmospheric glow discharges;

at least one counter electrode; and an AC voltage source generating an AC voltage connected to the electrode arrangement and the counter electrode, wherein one of the electrode arrangement and the at least one counter electrode comprises a surface electrode in the form of a layer of conducting material impregnatedly bonded to or deposited on an end surface of the filter.

26. An apparatus for removing particulates from a gas stream, comprising:

a filter through which gas may be caused to flow;

an electrode arrangement for producing atmospheric glow discharge, including at least one first electrode for producing the atmospheric glow discharge located near to but spaced apart upstream from an upstream end of the filter;

at least one counter electrode;

an AC voltage source generating an AC voltage connected to the electrode arrangement and the counter electrode; and means for electrically stabilizing the electrode arrangement.

27. An apparatus in accordance with claim 26 wherein said stabilizing means is positioned electrically between the AC voltage source and locations on the electrode arrangement at which the atmospheric glow discharges occur.

28. An apparatus in accordance with claim 26 wherein the AC voltage source generates an AC voltage in a frequency within the range of about 1 kHz to about 200 kHz.

29. An apparatus for removing particulates from a gas stream, comprising:

a filter through which gas may be caused to flow;

an electrode arrangement for producing atmospheric glow discharges;

at least one counter electrode;

an AC voltage source generating an AC voltage connected to the electrode arrangement and the at least one counter electrode; and a stabilizing impedance positioned electrically between the AC voltage source and locations on the electrode arrangement at which the atmospheric glow discharges occur.

30. An apparatus in accordance with claim 29 wherein said stabilizing impedance includes a resistor.

31. An apparatus in accordance with claim 29 wherein said electrode arrangement comprises a plurality of discharge electrodes.

32. An apparatus in accordance with claim 31 wherein said stabilizing impedance includes an impedance element associated with each discharge electrode.

33. An apparatus in accordance with claim 32 where each impedance element includes a resistor.

34. An apparatus in accordance with claim 29 wherein the AC voltage source generates an AC voltage at a frequency within a range of about 1 kHz to about 200 kHz.

35. An apparatus in accordance with claim 1 wherein the gas flow tube-stack is coated or impregnatingly bonded with a layer of conducting material to produce a surface electrode.

* * * * *